US012103145B2

(12) United States Patent
Hsieh

(10) Patent No.: US 12,103,145 B2
(45) Date of Patent: Oct. 1, 2024

(54) HAND TOOL FOR ENHANCING STRENGTH OF WORKING HEAD

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 154 days.

(21) Appl. No.: 16/990,548

(22) Filed: Aug. 11, 2020

(65) Prior Publication Data

US 2021/0046624 A1 Feb. 18, 2021

(30) Foreign Application Priority Data

Aug. 14, 2019 (TW) ................................ 108129012

(51) Int. Cl.
*B25B 23/00* (2006.01)
*B25B 23/16* (2006.01)

(52) U.S. Cl.
CPC ...... *B25B 23/0028* (2013.01); *B25B 23/0035* (2013.01); *B25B 23/16* (2013.01)

(58) Field of Classification Search
None
See application file for complete search history.

(56) References Cited

U.S. PATENT DOCUMENTS 1,498,712 A * 6/1924 York ...................... B25G 1/063 81/177.75
2,704,681 A * 3/1955 Fischer ................ F16B 21/186 403/326
4,170,909 A * 10/1979 Wagner .................. B25G 1/085 D8/107
5,485,769 A * 1/1996 Olson ................. B25B 23/0035 81/177.85
6,912,934 B2 * 7/2005 Liao ........................ B25B 15/04 81/58.3
7,367,249 B1 * 5/2008 Chiang ............... B25B 23/0035 81/177.85
8,186,248 B1 * 5/2012 Considine .............. B25G 1/063 81/177.9
11,597,062 B2 * 3/2023 Krupey .................... B25G 3/26
2007/0283790 A1 * 12/2007 Cheng .................... B25G 1/063 81/177.85
2016/0229039 A1 * 8/2016 Lee ....................... B25B 13/463

* cited by examiner

*Primary Examiner* — Bryan R Muller
*Assistant Examiner* — Dana Lee Poon
(74) *Attorney, Agent, or Firm* — CKC & Partners Co., LLC

(57) ABSTRACT

The invention is a hand tool for enhancing strength of a working head, which comprises: a main body with two parallel ears spaced apart at a front end; a working head with a pivotal portion pivotally connected between the ears of the main body; a column with one end connected to a periphery of the pivotal portion; and a strengthening portion extending from the periphery of the pivotal portion toward the column, and disposing at a junction of the pivotal portion and the column. An outer diameter of the strengthening portion is greater than an outer diameter of the column, the strengthening portion is capable of enhancing a strength of the column, relatively improving a torsion applied by the column to a workpiece, and enhancing durability and strength of the column.

11 Claims, 7 Drawing Sheets

HAND TOOL FOR ENHANCING STRENGTH OF WORKING HEAD

BACKGROUND OF THE INVENTION

Field of Invention

The invention relates to a hand tool, and more particularly to a hand tool capable of enhancing strength of a working head.

Related Art

Please refer to FIG. 1, which provides a conventional hand tool 10 including: a main rod 11 and a working head 12, a front end of the main rod 11 is provided with two parallel ears 111; the working head 12 has a pivotal portion 121 pivotally disposed between the two ears 111, the working head 12 is also provided with a column 122 connected to the pivotal portion 121, and a transition 123 is formed at a connecting position of the pivotal portion 121 and the column 122. By pivotally disposing the pivotal portion 121 of the working head 12 on the ears 111, a working direction can be changed by rotating the working head 12 relative to the main rod 11, and a workpiece is driven by the column 122 to tighten or loosen the workpiece.

However, in the conventional hand tool 10, the column 122 of the working head 12 is directly disposed on the pivotal portion 121, a thickness of the pivotal portion 121 is relatively larger, and a force-bearing strength thereof is relatively greater than a force-bearing strength of the column 122. In the process of applying a force, it is easy to cause damage to a junction between the column 122 and the pivotal portion 121, that is, the transition 123, because the transition 123 is where stress is concentrated and the weakest structure, so the working head 12 is often damaged or broken at the transition 123 and becomes unusable.

SUMMARY OF THE INVENTION

A main object of the invention is to provide a hand tool capable of strengthening a strength of a column of a head and enhancing a torsion.

In order to achieve the above object, the invention provides a hand tool for enhancing strength of a working head, comprising:

a main body with a front end having two ears, the two ears are disposed in parallel and spaced apart; and a working head having a pivotal portion, the pivotal portion is pivotally connected between the ears of the main body; a column with a top end connected to a bottom periphery of the pivotal portion; and a strengthening portion extending from the bottom periphery of the pivotal portion toward the column, and disposing at a junction of the pivotal portion and the column, and an outer diameter of the strengthening portion is greater than an outer diameter of the column.

Preferably, the strengthening portion is cylindrical.

Preferably, an arcuate bearing portion is formed at an abutted surface between the strengthening portion and the column.

Preferably, an outer diameter of the pivotal portion is smaller than an outer diameter of the strengthening portion, and reinforcement blocks are provided at junctions of the pivotal portion and the strengthening portion.

With the strengthening portion of the working head disposing between the pivotal portion and the column, the hand tool for enhancing strength of the working head provided by the invention is capable of providing a strengthening effect and increasing a force-bearing area and a force-bearing strength, making the column to be capable of withstanding greater torsion, thereby the column is not easily damaged to improve the strength and service life.

BRIEF DESCRIPTION OF THE DRAWINGS

In order to enable the examiner to further understand the object, features and achieved efficacies of the invention, two preferred embodiments are listed below, which will be described in detail hereinafter in conjunction with the drawings, wherein.

DETAILED DESCRIPTION OF THE INVENTION

Figure 1:
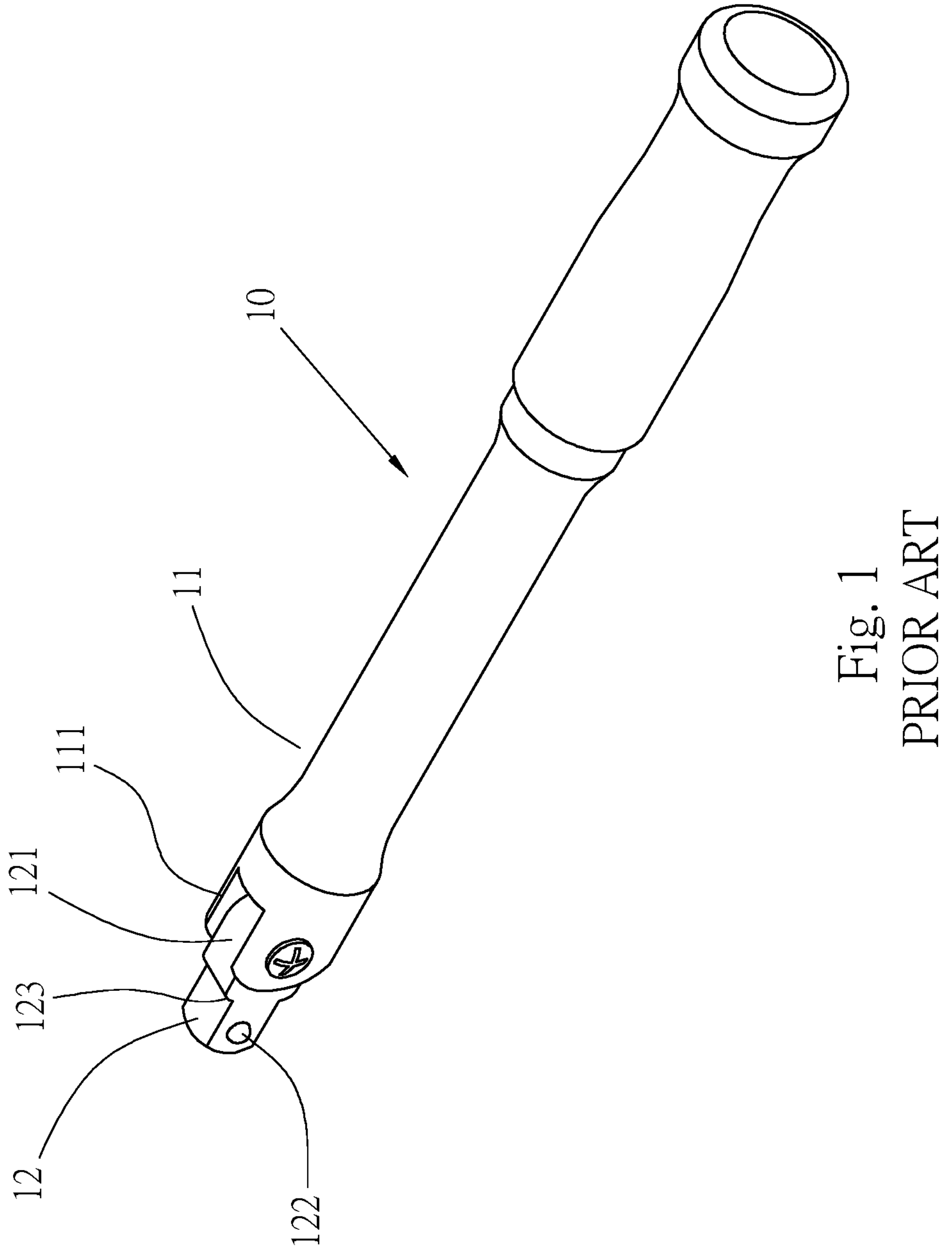
Fig. 1 PRIOR ART
FIG. 1 is a perspective view of a conventional hand tool.
Figure 2:
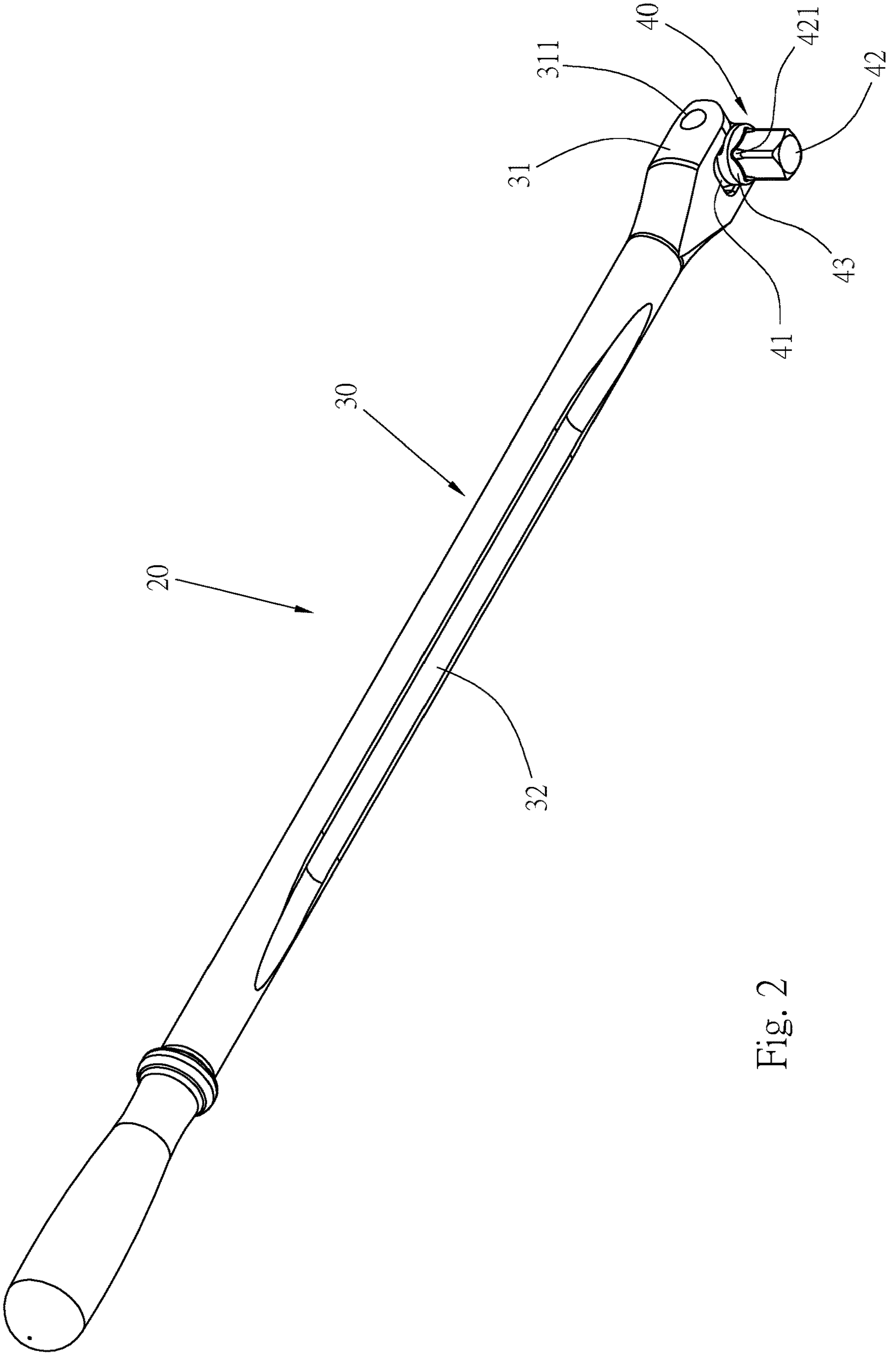
FIG. 2 is a perspective view of a hand tool according to one preferred embodiment of the invention.
Figure 3:
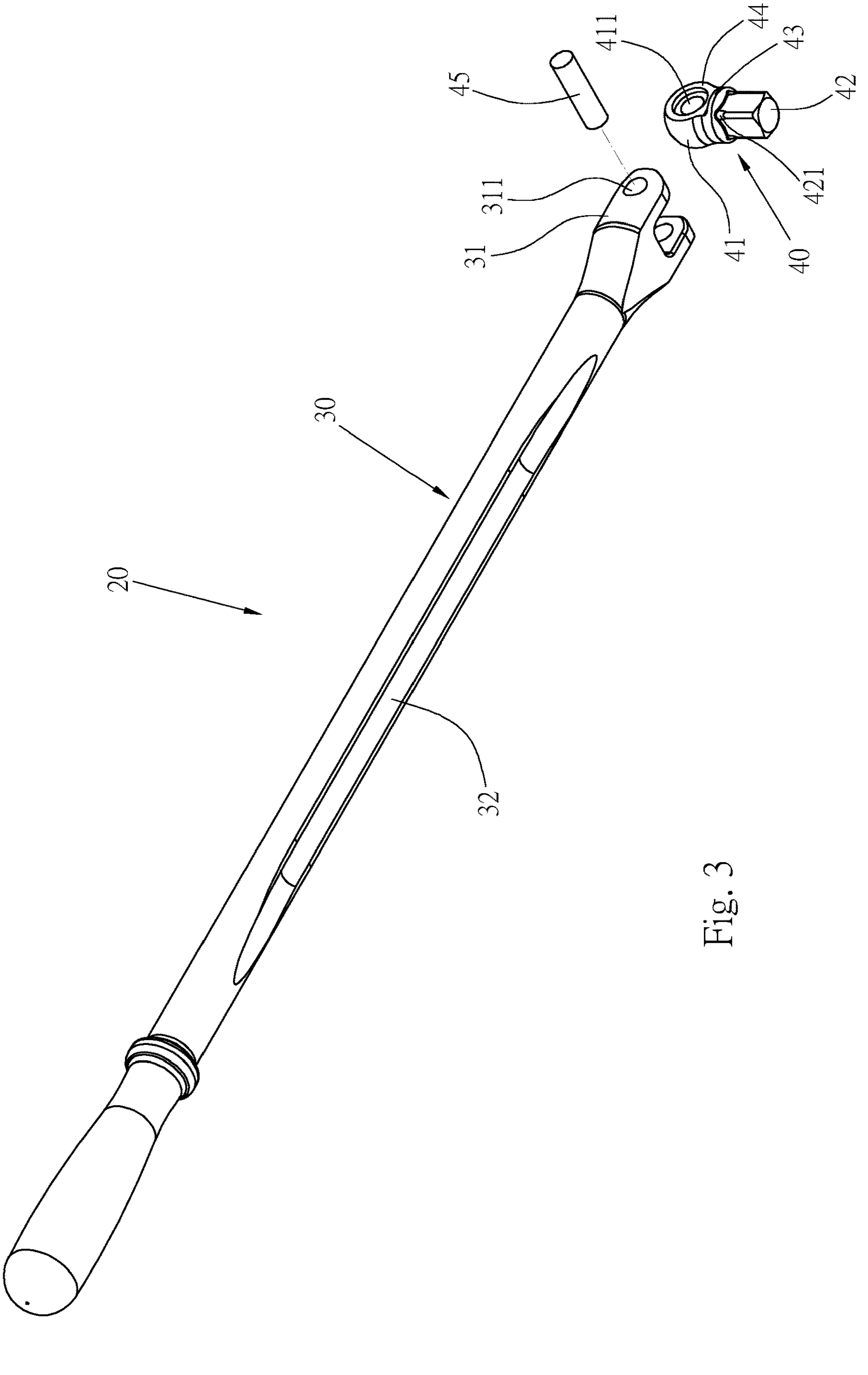
FIG. 3 is an exploded perspective view of FIG. 2.

Please refer to FIGS. 2 to 3, which show a hand tool 20 provided by one preferred embodiment of the invention, including: a main body 30 and a working head 40;

the main body 30 is provided with two spaced apart and parallel ears 31 at a front end, the two ears 31 are provided with coaxial connecting holes 311 therethrough; in this embodiment, the main body 30 is integrally formed with a shaft 32 at rear ends of the two ears 31, and can also be formed with an assembling portion for assembling with a head of another tool.

Figure 4:
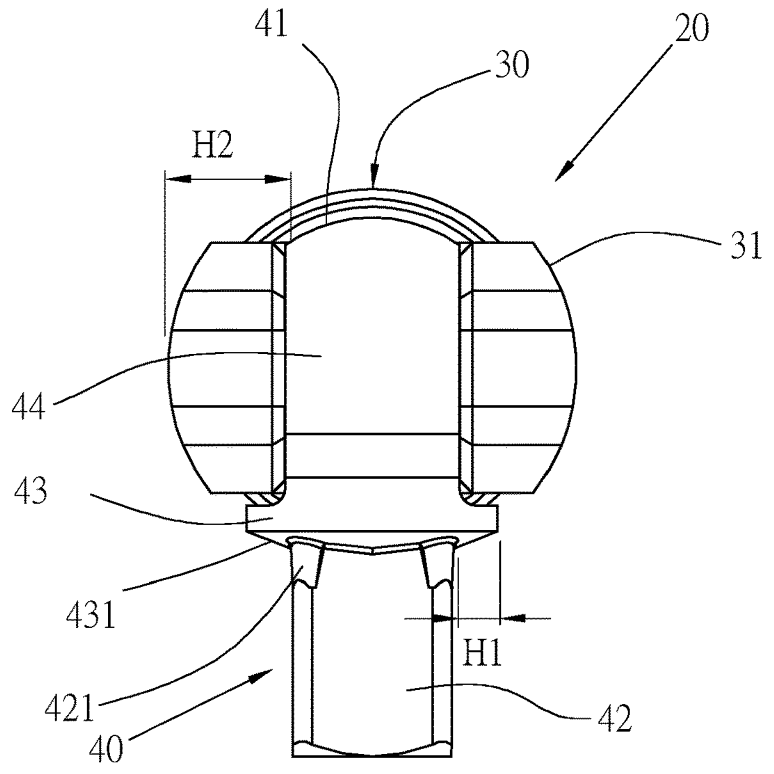
FIG. 4 is a front view of the hand tool of FIG. 2.
Figure 5:
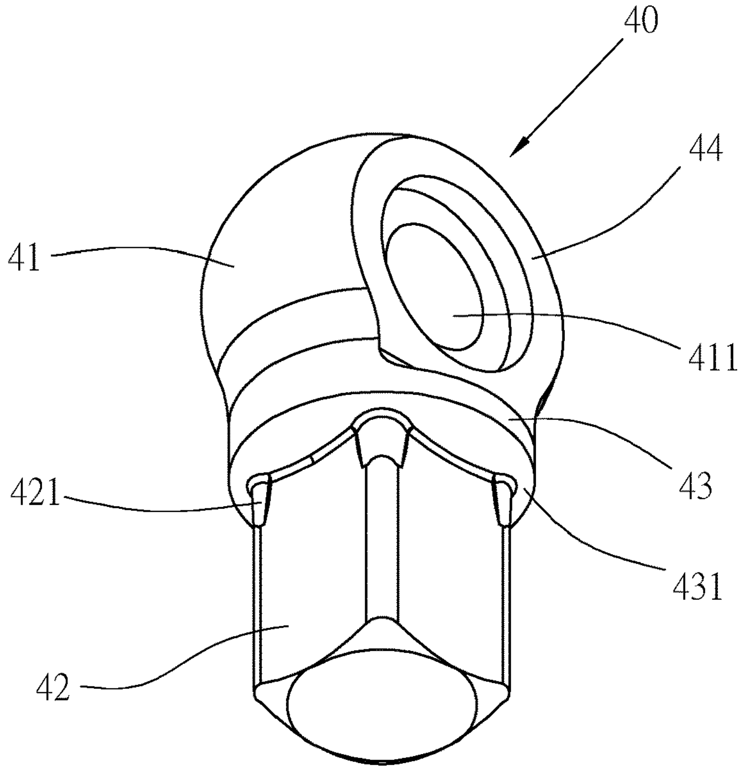
FIG. 5 is a perspective view of a working head of the hand tool.

Please refer to FIGS. 3 to 5, the working head 40 has a pivotal portion 41 with a through hole 411 penetrating through a center thereof; a column 42 with a top end connected to a bottom periphery of the pivotal portion 41, in this embodiment, the column 42 is composed of a square head, shape and size thereof can be changed according to requirements; and a strengthening portion 43 extending from the bottom periphery of the pivotal portion 41 toward the column 42, provided at a junction between the pivotal portion 41 and the column 42, and formed in a cylindrical shape. An outer diameter of the strengthening portion 43 is larger than an outer diameter of the column 42, an arcuate bearing portion 431 is formed at an abutted surface between the strengthening portion 43 and the column 42. The bearing portion 431 is connected to a bottom of the column 42 with an arcuate curved surface. Two flat connecting surfaces 44 are provided at two sides of the working head 40 and are parallel to a radial direction of the through hole 411. A periphery of the strengthening portion 43 protrudes above the two flat connecting surfaces 44, and the two flat connecting surfaces 44 adjacent with inner sides of the two ears 31 of the main body 30. Please refer to FIG. 4, a width H1 of the periphery of the strengthening portion 43 protruding above the flat connecting surfaces 44 is smaller than a width H2 of the ears 31 of the main body 30. As shown in FIGS. 2 and 4, the connecting holes 311 of the two ears 31 overlap with the through hole 411 of the pivotal portion 41, and a pin 45 penetrates the overlapping connecting holes 311 and through hole 411, so that the working head 40 can be pivotally connected on the main body 30. In order to enhance a strength of the column 42, thickened portions 421 are provided at intersection angles of the column 42, at a junction between a top of the column 42 and the strengthening portion 43.

Figure 6:
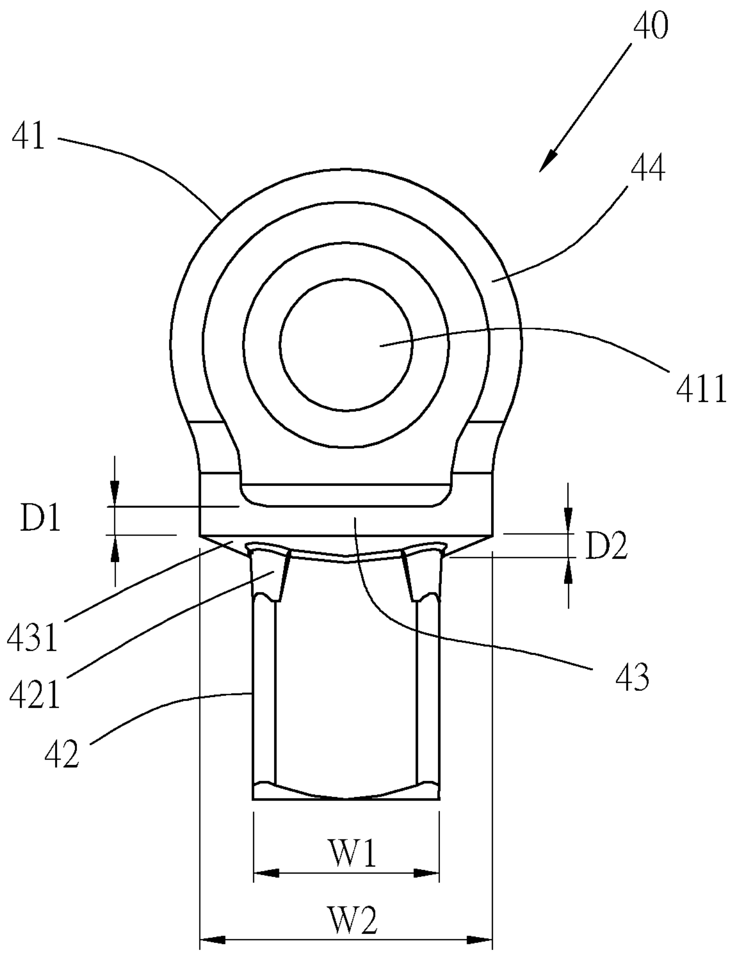
FIG. 6 is a side view of the working head.

Please refer to FIG. 6, an outer diameter of the pivotal portion 41 at a center position is W1, an outer diameter of the column 42 is W2, and an outer diameter of the strengthening portion 43 is W3. In this embodiment, sizes of the outer diameters are in an order of W1>W3>W2. The strengthening portion 43 extends outward from the pivotal portion 41 and increases a thickness of connection between the column 42 and the pivotal portion 41. In addition, a thickness of the strengthening portion 43 is D1, and a thickness of the bearing portion 431 is D2. In this embodiment, the thickness D1 of the strengthening portion 43 is greater than the thickness D2 of the bearing portion 431, and a thickness ratio can be changed and adjusted as required, and the thickness D2 of the bearing portion 431 can also be made greater than the thickness D1 of the strengthening portion 43.

Figure 7:
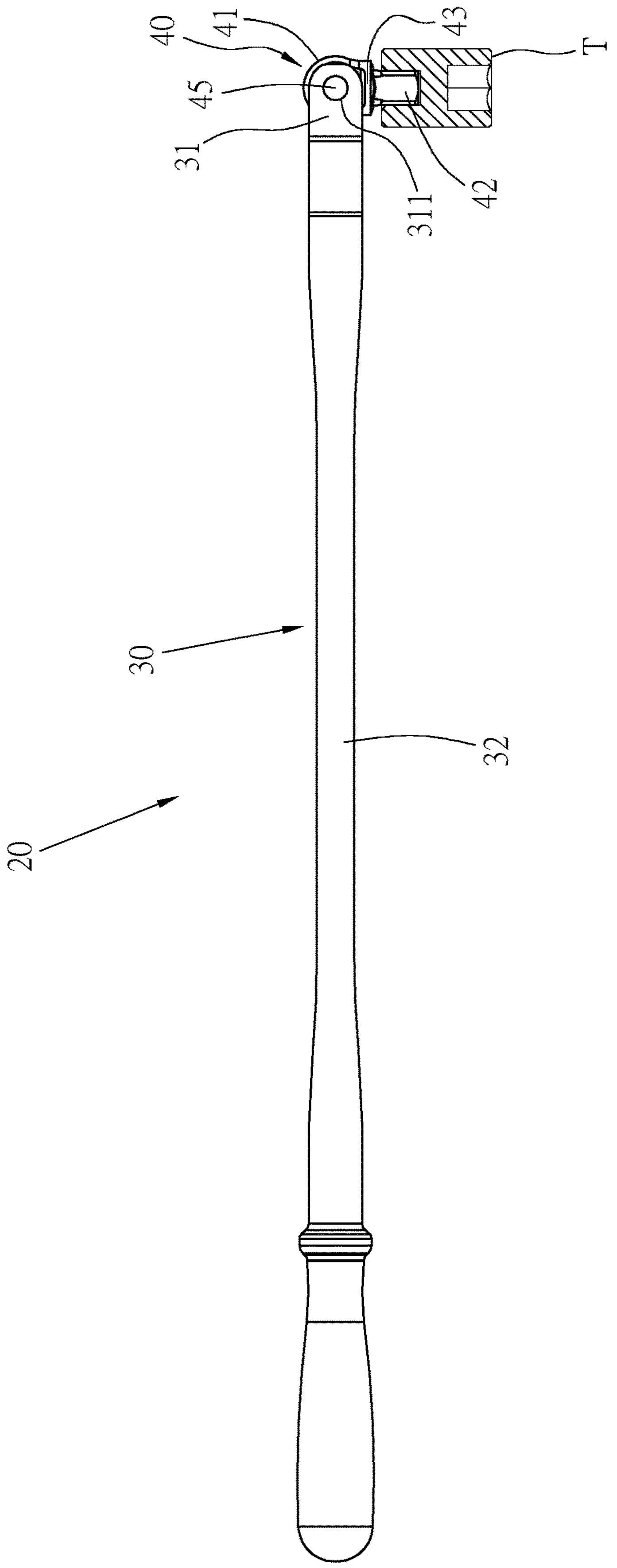
FIG. 7 is a schematic diagram of operation of one preferred embodiment of the invention.

Please refer to FIG. 7. In actual operation, the working head 40 of the hand tool 20 is sleeved on a workpiece T (such as a socket), and an angle between the main body 30 and the working head 40 is adjusted. After adjusting the operating angle, apply a rotational acting force at a position of the shaft 32, the shaft 32 transmits the force to the two ears 31, and then to the pivotal portion 41 of the working head 40. Through the pivotal portion 41 rotating the strengthening portion 43 and the column 42, and the strengthening portion 43 enabling a larger width formed at a junction between the column 42 and the pivotal portion 41, a force-bearing area can be relatively increased when the force is applied. Thereby, the column 42 is capable of withstanding a greater force being applied; thus, strength of the column 42 and torsion being borne can be increased, and the service life can be enhanced. At the same time, the thickened portions 421 of the column 42 are also capable of generating a greater force-bearing area to increase a strength between the column 42 and the strengthening portion 43, and prevent the working head 40 from being damaged at a position where the column 42 and the strengthening portion 43 are joined. In addition, a position where the arcuate bearing portion 431 connected to the column 42 is nonlinear, which can prevent stress from being applied to a same level when force is applied, and can reduce the stress concentration. The width H1 of the strengthening portion 43 protruding above the flat connecting surfaces 44 without protruding above the width H2 of the two ears 31 of the main body 30 is capable of avoiding interference caused by excessive protrusion of the strengthening portion 43 during operation, or damage caused by collision during use.

Figure 8:
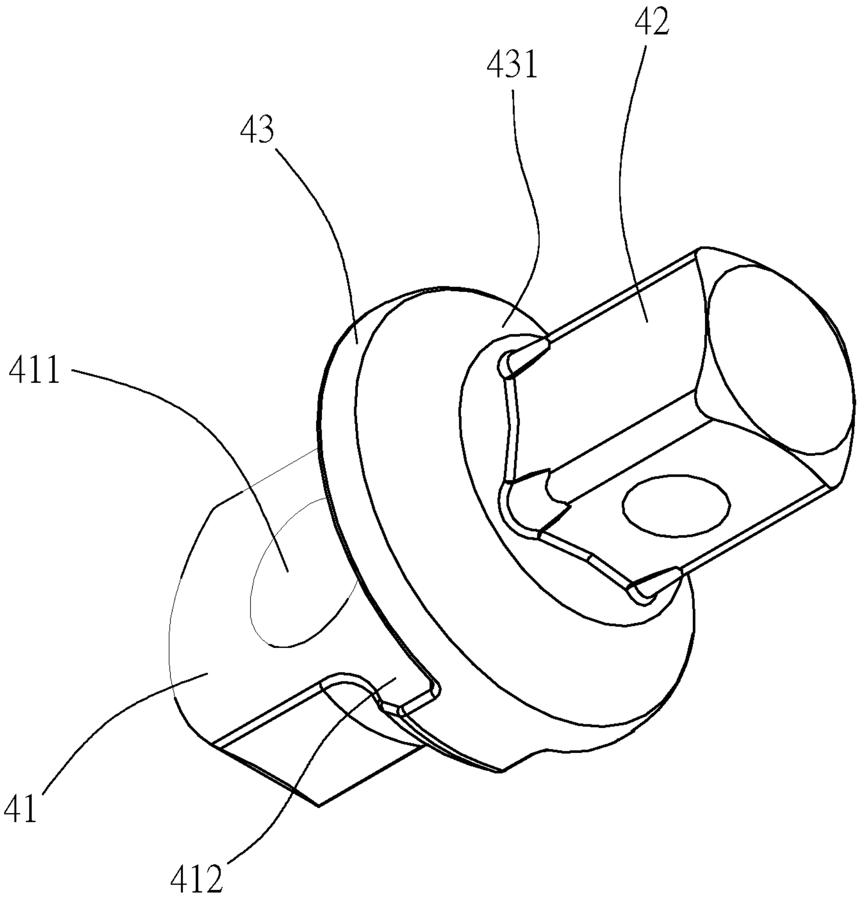
FIG. 8 is a perspective view of the working head according to a second preferred embodiment of the invention.

Please refer to FIG. 8 for the working head 40 of a second preferred embodiment provided by the invention. The main structure of the working head 40 is the same as that of the first preferred embodiment, and the same components are marked with the same reference numerals, which will not be repeated, wherein:

a width of the strengthening portion 43 of the working head 40 is greater than that of the pivotal portion 41, reinforcement blocks 412 are provided at junctions of front and rear ends of the pivotal portion 41 and the strengthening portion 43, so that the junctions of the pivotal portion 41 and the strengthening portion 43 can also be strengthened to prevent the pivotal portion 41 from being damaged at the junctions of the strengthening portion 43 and the pivotal portion 41 due to a relatively smaller width of the pivotal portion 41.

In the hand tool provided by the invention, the strengthening portion of the working head is capable of enhancing the force-bearing strength of the column. Compared with the drawback of being easily damaged at the transition between the pivotal portion and the column due to no strengthening structure disposing between the pivotal portion and the column of the conventional working head, the working head of the invention is additionally provided with the strengthening portion between the column and the pivotal portion to enhance the force-bearing area and force-bearing strength of the column to be capable of improving the service life and torsion of the working head.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A hand tool for enhancing strength of a working head comprising:

a main body with a front end having two ears, the two ears being disposed in parallel and spaced apart; and a working head having a pivotal portion, two flat connecting surfaces disposing at two sides of the pivotal portion respectively, the pivotal portion being pivotally connected between the ears of the main body and turnable; a column with an end connected to a bottom periphery of the pivotal portion; and a strengthening portion extending from the bottom periphery of the pivotal portion toward the column, and disposing at a junction of the pivotal portion and the column, an outer diameter of the strengthening portion being greater than an outer diameter of the column, and an outer periphery of the strengthening portion protruding outwardly beyond the two flat connecting surfaces;

wherein a bearing portion has a bottom surface that is arcuate and curved, and is protruding outwardly and formed at an abutted surface located between the strengthening portion and the column;

wherein an edge is disposed at a junction of two adjacent side surfaces of the column, and a thickened portion is disposed on a junction between the column and the strengthening portion and along the edge towards a corner of the column;

wherein a number of the thickened portion is four, and the four thickened portions are close to the strengthening portion and connected to the bearing portion;

wherein each of the four thickened portions has a surface profile that is convex and arcuate shaped spanning the longitudinal edge of the column between two faces of the column.

2. The hand tool as claimed in claim 1, wherein the strengthening portion is cylindrical.

3. The hand tool as claimed in claim 2, wherein a thickness of the strengthening portion is greater than a thickness of the bearing portion.

4. The hand tool as claimed in claim 2, wherein a thickness of the strengthening portion is smaller than a thickness of the bearing portion.

5. The hand tool as claimed in claim 1, wherein a thickness of the strengthening portion is greater than a thickness of the bearing portion.

6. The hand tool as claimed in claim 1, wherein a thickness of the strengthening portion is smaller than a thickness of the bearing portion.

7. The hand tool as claimed in claim 1, wherein the outer diameter of the strengthening portion is greater than a width of the pivotal portion, and reinforcement blocks are provided at junctions of two end sides of the pivotal portion and the strengthening portion.

8. The hand tool as claimed in claim 1, wherein the column of the working head is a polygonal column body.

9. The hand tool as claimed in claim 1, wherein the two ears of the main body are provided with connecting holes therethrough, the pivotal portion is provided with a through hole opposite to the connecting holes, and a pin is pivotally disposed between the connecting holes and the through hole.

10. The hand tool as claimed in claim 1, wherein a width of the strengthening portion protruding above the flat connecting surface is smaller than a width of the ear of the main body.

11. The hand tool as claimed in claim 1, wherein the main body is integrally formed with a shaft at rear ends of the two ears.

* * * * *